(12) United States Patent
Binkert et al.

(10) Patent No.: US 8,391,714 B2
(45) Date of Patent: Mar. 5, 2013

(54) OPTICAL BROADCAST SYSTEMS AND METHODS

(75) Inventors: Nathan L. Binkert, Redwood City, CA (US); Dana M. Vantrease, Madison, WI (US); Moray McLaren, Bristol (GB); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 12/999,620

(22) PCT Filed: Jun. 17, 2008

(86) PCT No.: PCT/US2008/007540
§ 371 (c)(1),
(2), (4) Date: Dec. 16, 2010

(87) PCT Pub. No.: WO2009/154592
PCT Pub. Date: Dec. 23, 2009

(65) Prior Publication Data
US 2011/0097086 A1    Apr. 28, 2011

(51) Int. Cl.
*H04J 14/00* (2006.01)
(52) U.S. Cl. ............... 398/66; 398/58; 398/59; 398/60; 398/63; 398/67; 398/68
(58) Field of Classification Search .............. 398/66, 398/60, 73
See application file for complete search history.

(56) References Cited

U.S. PATENT DOCUMENTS

| 4,494,185 | A | * | 1/1985 | Gunderson et al. ........... 709/252 |
| 4,662,715 | A |   | 5/1987 | Shutterly |
| 4,720,160 | A | * | 1/1988 | Hicks, Jr. ..................... 385/31 |
| 4,754,452 | A | * | 6/1988 | Henry ........................... 370/458 |
| 5,058,101 | A | * | 10/1991 | Albanese et al. ............... 398/73 |
| 5,369,516 | A |   | 11/1994 | Uchida |
| 6,411,752 | B1 |   | 6/2002 | Little |
| 6,823,108 | B1 | * | 11/2004 | Leisching .................... 385/27 |
| 6,947,632 | B2 |   | 9/2005 | Fischer |
| 2007/0258714 | A1 |   | 11/2007 | Little et al. |

FOREIGN PATENT DOCUMENTS

| EP | 0452895 | 10/1991 |
| JP | 1983-073253 | 5/1983 |
| JP | 1988-074238 | 4/1988 |
| JP | 1992-117042 | 4/1992 |
| JP | 4291317 | 10/1992 |
| JP | 1997-153907 | 6/1997 |
| JP | 2005-064950 | 3/2005 |

(Continued)

OTHER PUBLICATIONS

"Interconnections in Multi-core Architectures: Understanding Mechanisms, Overheads, and Scaling," by R. Kumar, V. Zyuan, and D. M. Tullsen, SIGARCH Computer Architecture News 33.2, pp. 408-419 (May 2005).

(Continued)

*Primary Examiner* — Danny Leung

(57) ABSTRACT

Embodiments of the present invention are directed to optical broadcast systems. The nodes of the system can be any combination of cores, caches, input/output devices, and memory, or any other information processing, transmitting, or storing device. The optical broadcast system includes an optical broadcast bus. Any node of the system in optical communication with the broadcast bus can broadcast information in optical signals to all other nodes in optical communication with the broadcast bus.

14 Claims, 12 Drawing Sheets

FOREIGN PATENT DOCUMENTS

JP      2007-013893      1/2007
WO      WO-2007128649    11/2007

OTHER PUBLICATIONS

Xu, Qianfan, et al., "Cascaded silicon micro-ring modulators for WDM optical interconnection", Optics Express, Oct. 2, 2006, vol. 14, No. 20, pp. 9430-9435.

Little, B. E., et al. "Mirroring resonator arrays for VLSI photonics." Photonics Technology Letters, IEEE 12.3 (2000): 323-325.

Supplemental EP Search Report (Sep. 27, 2012), Hewlett-Packard Development Co., L.P., EP Application No. 08768539.2, Filed Dec. 23, 2010.

\* cited by examiner

OPTICAL BROADCAST SYSTEMS AND METHODS

TECHNICAL FIELD

Embodiments of the present invention relate to distributing optical signals on an optical broadcast system.x

BACKGROUND

In recent years, trends in the microelectronic industry indicate that future multiprocessor chips may be composed of tens or even hundreds of nodes. A node can be a processing element also called a core and other devices such as caches, input/output, and memory. A desirable feature is that an on-chip broadcast bus provides any one node communication with all nodes on the chip, which is called "any-to-all" communication. In principle, any node which can drive the bus can broadcast information over the bus to all nodes that tap the bus. For example, a broadcast can be used to maintain coherency of any given core's cache.

As the number of nodes increases the bus must scale accordingly. At the same time performance improvements in the node itself require an equivalent increase in bandwidth from the bus. The larger node count leads to greater interconnect path lengths which in turn lead to, greater signal integrity issues, increased chip area requirements, and higher power. These factors, combined with the requirement for higher bandwidth to match the node performance, make the implementation of large scale on chip electronic broadcast buses impractical for high node count, high performance chips.

To overcome these limitations, hierarchical buses have been proposed, such as a bus connected to eight nodes, and sets of buses connected with peer-to-peer links. See e.g., "Interconnections in Multi-core Architectures: Understanding Mechanisms, Overheads, and Scaling," by R. Kumar, V. Zyuan, and D. M. Tullsen, *SIGARCH Computer Architecure News* 33, 2, pp. 408-419 (May 2005). However, in general, most electrical multi-core processor solutions avoid broadcast interconnects altogether in favor of one-to-one interconnects, such as a mesh. Where broadcast functionality is necessary, broadcast messages are broken down into identical one-to-one messages for each core. While this functionally works for many systems, the redundancy consumes extra bandwidth and power and leads to latency.

An optical bus promises a much higher bandwidth, lower power and lower latency when compared to an electrical bus. However, even with optics, one-to-all bus configurations made up of a number of fixed-sender broadcast buses do not scale well with respect to power and surface area, because as many buses as senders are needed.

Accordingly, an optical, scalable broadcast bus that exhibits low-latency and high-bandwidth is desired. In particular, an on-chip version of such an optical, scalable bus is highly desirable.

SUMMARY

Embodiments of the present invention are directed to an optical broadcast system for broadcasting information from any node to all other nodes of a system. In one embodiment, an optical broadcast system for broadcasting information from any one node to all nodes of a system includes an optical broadcast bus comprising a modulator portion and a detector portion. Each of the nodes controls a modulator optically coupled to the modulator portion, and each node controls a detector optically coupled to the detector portion. An optical power source injects unmodulated light into the optical broadcast bus which a modulator at a node modulates under the control of its node to generate one or more optical signals carrying information from its respective node on the broadcast bus. The optical broadcast bus is configured so that the modulator portion passes each node's modulator. The modulator portion is followed by the detector portion which passes each node's detector. Each detector is optically coupled to the detector portion so that all of the nodes receive the optical signals generated by the modulators.

Another embodiment in accordance with the present invention comprises, a method for broadcasting information from any node to all nodes of a system. The method comprises injecting unmodulated light into an optical broadcast bus having a modulator portion and a detector portion. The optical broadcast bus has a wrap-around configuration wherein the modulator portion passes each node followed by the detector portion passing each node. The method continues with arbitrating to determine which node or nodes can broadcast over the optical broadcast bus, and the node or nodes modulating the unmodulated light in the modulator portion of the optical broadcast bus to produce optical signals that travel from the modulation portion into the detector portion. The optical signals are received at all of the nodes in the detector portion of the optical broadcast bus. By this method, any one node at a time can use the optical bus waveguide to distribute information to all of the nodes.

Additionally, in some embodiments injecting unmodulated light into the bus waveguide includes injecting multiple wavelengths of light into the bus waveguide using wavelength division multiplexing (WDM) or dense wavelength division multiplexing (DWDM). The use of WDM or DWDM allows nodes whose modulators are not modulating light of the same wavelength to broadcast at the same time.

DETAILED DESCRIPTION

Embodiments of the present invention are directed to optical broadcast systems for broadcasting information over a system of nodes. The optical broadcast system enables any one node to broadcast to all nodes of a system and is also referred to as an any-to-all optical broadcast system. The term "node" refers to a core, a cache, an input/output device, and memory, or any other processing, transmitting, or storing device, and the term "system of nodes" can refer to a computer system for example. An any-to-all optical broadcast communication system can be power and latency efficient in any system of nodes where there are multiple processing elements with a requirement for one node to provide the same data to multiple other nodes. Examples of such systems include maintaining cache consistency between multiple cores in a multicore processor, redistributing data across an array of signal processors, and multicasting in network switches. At current data rates electronic broadcast buses cannot span an entire integrated circuit. Repeaters and retimers can be used to mitigate these issues, but these add significantly to both power and latency.

Broadcast system and method embodiments are described below with reference to schematic representations of different kinds of optical broadcast systems. Those skilled in the art will immediately recognize that these broadcast systems and methods can be readily scaled up or down to provide broadcasting capabilities for systems having different numbers of nodes.

I. Optical Broadcast Systems

Figure 1A:
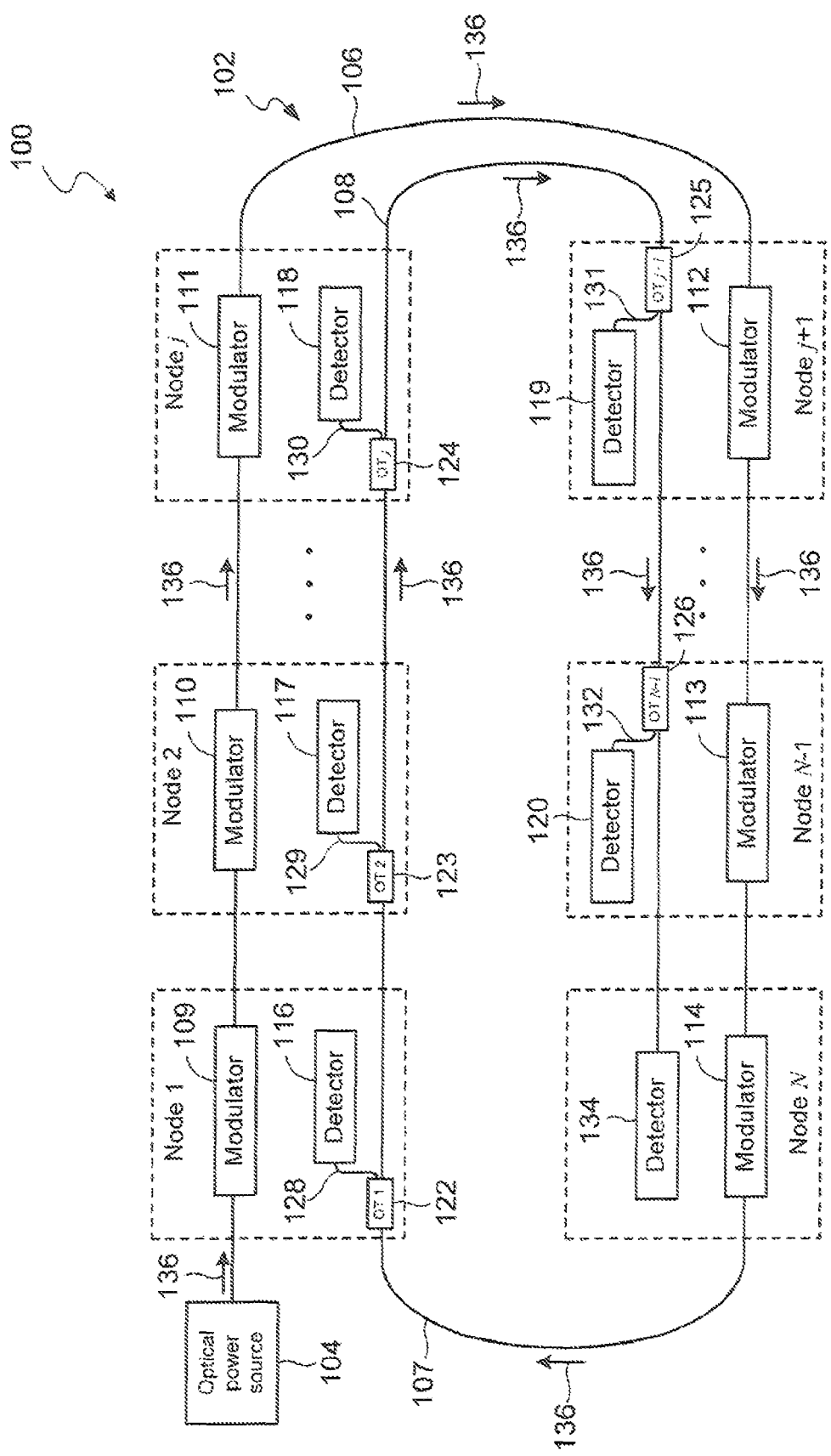
FIG. 1A shows a schematic representation of a first optical broadcast system configured in accordance with embodiments of the present invention.

FIG. 1A shows a schematic representation of a first optical broadcast system 100 configured in accordance with embodiments of the present invention. The broadcast system 100 provides optical broadcasting capabilities for each of N nodes, where N is a whole number. As shown in the example of FIG. 1A, only six of the N nodes are represented, and the nodes are labeled in this example in a clockwise manner 1 through N. The broadcast system 100 includes an optical broadcast bus composed of bus waveguide 102 that is optically coupled at one end to an optical power source 104 which injects unmodulated light into the waveguide. The bus waveguide 102 includes three portions, a modulator portion 106, a detector portion 108 that follows the modulator portion 106, and a connector portion 107 that connects the modulator portion 106 to the detector portion 108. For example, tracing the path of the waveguide 102 in a clockwise manner from the source 104 reveals the modulator portion 106 of the waveguide 102 that passes each of the N nodes and the detector portion 108 of the waveguide 102 that also passes each of the N nodes and terminates at node N. In other words, the wrap-around arrangement of the bus waveguide 102 enables the bus waveguide 102 to pass each of the N nodes twice in this example, once for modulation and once for detection. The bus waveguide 102 can be a single waveguide or can be made up of a set of waveguides that traverse the wrap-around arrangement.

The broadcast system 100 includes N modulators optically coupled to the modulator portion 106. Each modulator is in optical communication with the waveguide 102 and in electronic communication with an associated node. For example, as shown in FIG. 1A, modulators 109-114 are in optical communication with the modulator portion 106 of the waveguide 102 and in electronic communication with nodes 1, 2, j, j+1, N−1, and N, respectively. When a node is to send information, it sends the information to its associated modulator which generates an optical signal carrying the information by modulating a wavelength of the unmodulated light traversing the waveguide 102. A more detailed description of the configuration and operation of examples of modulators is provided below in a second subsection titled Modulators.

The broadcast system 100 also includes N detectors optically coupled to the detector portion 106 of the waveguide 102. Each detector is in electronic communication with an associated node. Thus, the detector can receive an optical signal and convert the information it carries to an electronic signal which it communicates to its associated node. The optical broadcast bus also includes optical taps and branching waveguides that enable the detectors to optically communicate with the waveguide 102. For example, as shown in FIG. 1A, detectors 116-120 are in electronic communication with nodes 1, 2, j, j+1, and N−1, respectively, and in optical communication with the detector portion 106 of the waveguide 102 via optical taps 122-126 and branching waveguides 128-132, respectively. Detector 134 is in direct optical communication with the detector portion 106 of the waveguide 102 and in electronic communication with node N. A more detailed description of the configuration and operation of examples of detectors is provided below in a third subsection titled Detectors, and a more detailed description of the configuration and operation of examples of optical taps is provided below in a forth subsection titled Optical Taps.

The optical power source 104 is configured to output p wavelengths of unmodulated light that are input to the bus waveguide 102 using WDM or DWDM, where p is a whole number. The term "light" refers to electromagnetic radiation which can be composed in a variety of different wavelengths. For example, the wavelengths can lie in the visible, infrared, and/or ultraviolet portions of the electromagnetic spectrum. As shown in the example of FIG. 1A, directional arrows 136 represent the direction the light propagates along the waveguide 102 passing each modulator in a clockwise direction in this example.

A single node broadcast information to all of the nodes over the bus waveguide 102 by controlling an associated modulator that modulates at most p wavelengths of the unmodulated light propagating along the waveguide 102 to produce at most p optical signals that carry the information along the remainder of the modulator portion 106 of the waveguide 102. For example, node 2 broadcasts information to nodes 1 through N by modulating at most p wavelengths of the unmodulated light transmitted along the waveguide 102 to produce at most p corresponding optical signals that carry the information past the remaining nodes j though N on the modulator portion 106 of the waveguide 102. The optical signals then enter the detector portion 108 of the waveguide 102 where each optical tap (e.g. 122, 124) associated with each of the nodes diverts a portion of the optical signal power associated with the optical signals into its branching waveguide (e.g. 128, 130).

Note that the optical taps of the optical broadcast system 100 sequentially divert broadcast optical signals from the bus waveguide 102. However, the optical power losses associated with sequentially diverting an optical signal in this manner can be large. In other embodiments of the present invention, the optical power loss can be reduced by configuring an optical broadcast system with a tree-like optical broadcast bus of optical taps. Appropriate splitters can be used at waveguide branch points to implement the tree optical broadcast bus in some embodiments. Each splitter is configured to split an incoming optical signal into multiple output optical signals that each carry approximately the same optical power.

Figure 1B:
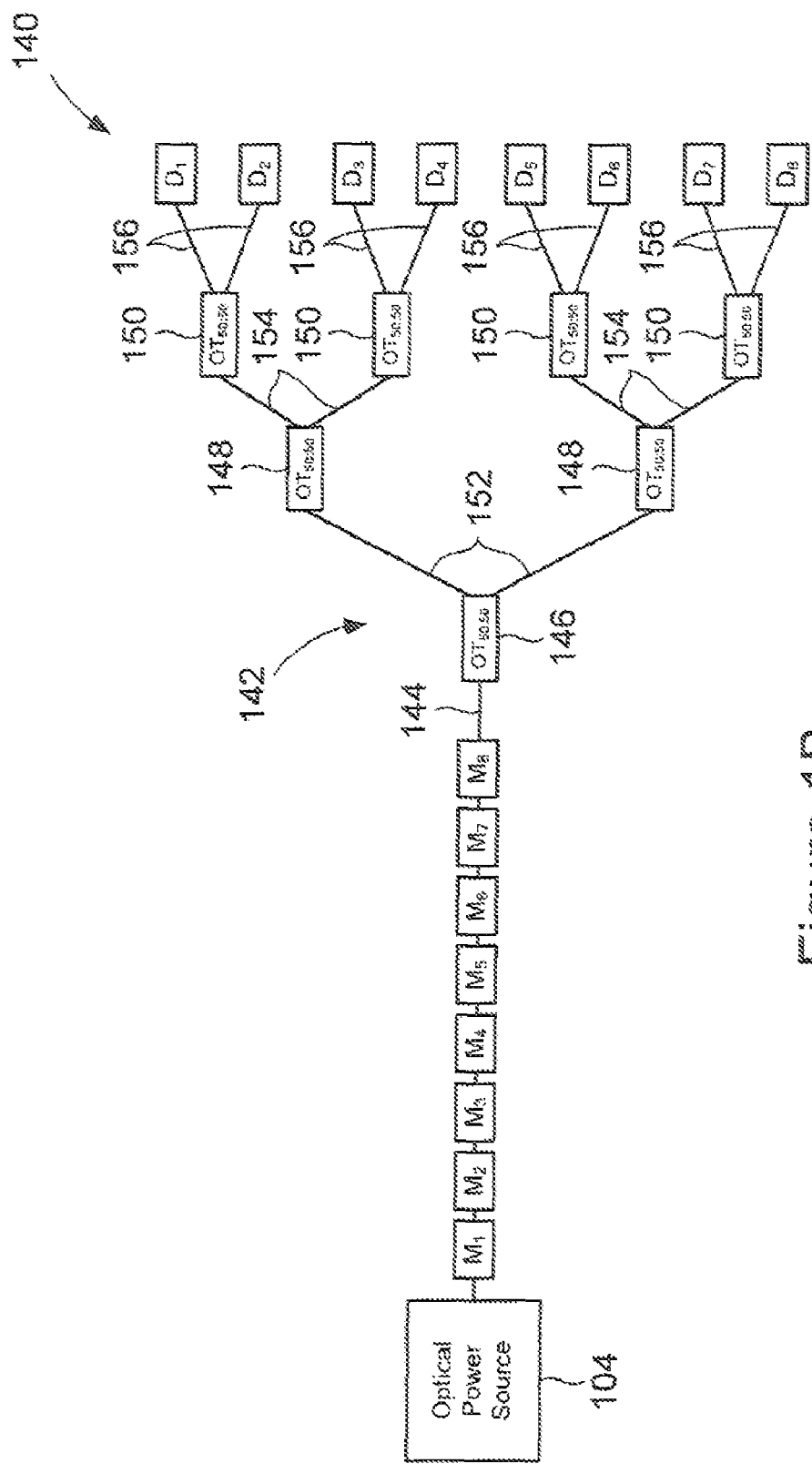
FIG. 1B shows a tree topology of a first optical broadcast tree system configured in accordance with embodiments of the present invention.

FIG. 1B shows a tree topology of a first optical broadcast tree system 140 configured in accordance with embodiments of the present invention. The broadcast system 140 includes an optical broadcast tree bus 142 having a binary tree configuration. In particular, the broadcast tree bus 142 includes a bus waveguide modulator portion 144 that is optically coupled at one end to the source 104. The broadcast tree bus 142 is composed of three levels of optical taps. The first level includes a root optical tap 146 optically coupled to the bus waveguide modulator portion 144, a second level of optical taps 148, and a third level of optical taps 150. As shown in the example of FIG. 1B, each of the optical taps 148 is optically coupled to the root optical tap 146 via waveguide branches, shown in this example implemented with a single branching waveguide 152 and optically coupled to two optical taps 150 via separate branching waveguides 154. FIG. 1B also reveals that each optical tap 150 is coupled to two detectors via separate branching waveguides 156.

The broadcast tree bus 142 is configured to support broadcast for an eight node system. The detectors of the broadcast system 140 are represented by the letter "D" and are each separately identified by subscripts 1-8. The broadcast system 140 also includes eight modulators represented by the letter "M," and each modulator is separately identified by subscripts 1-8. The modulators are optically coupled to the bus waveguide modulator portion 144. Each modulator and corresponding detector having the same subscript are controlled by the same node. For example, modulator 3 and detector 3 are electronically coupled to the same node (not shown).

Figure 1C:
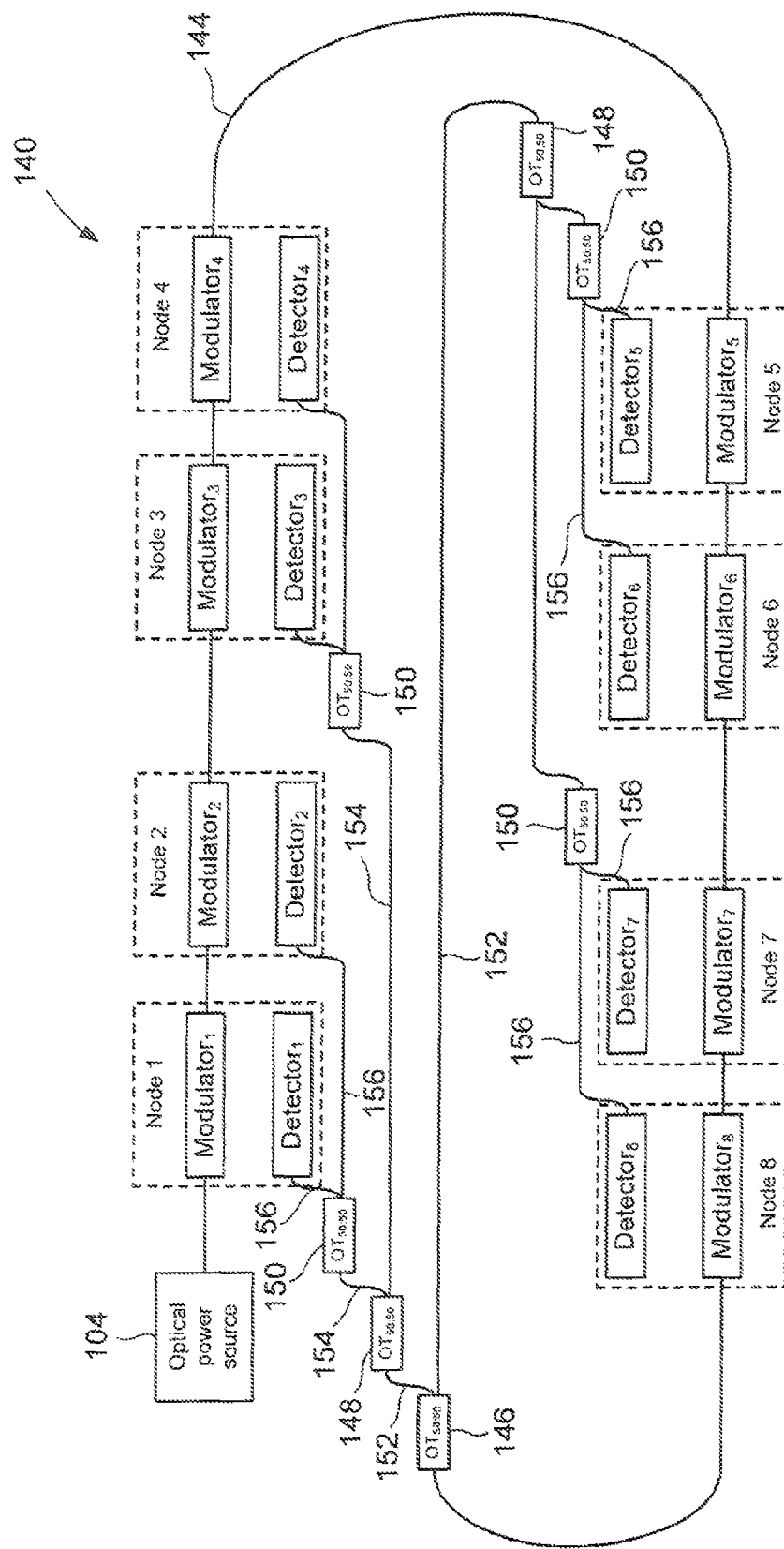
FIG. 1C shows a schematic representation of the first optical broadcast tree system configured in accordance with embodiments of the present invention.

FIG. 1C shows a schematic representation of the first optical broadcast tree system configured in accordance with embodiments of the present invention. FIG. 1C reveals one way in which the topology shown in FIG. 1B can be implemented in a wrap-around arrangement that places each of the modulators 1-8 and corresponding detectors 1-8 in electronic communication with an associated node. This wrap-around arrangement also enables each node to modulate and detect optical signals on the same clock skew.

The source 104 outputs p wavelengths of unmodulated light into the bus waveguide 144 using WDM or DWDM. Any one of the nodes can broadcast information to all of the nodes over the bus waveguide 142 by controlling an associated modulator to modulate at most p wavelengths of the unmodulated wavelengths of light propagating along the bus waveguide 144 to produce at most p optical signals that carry the information to the branching waveguides. In FIGS. 1B-1C, the optical taps are identified as 50:50 or 2-way splitters that split each optical signal into two identical optical signals each of which has approximately the same optical power. Thus, all optical signals pass through three optical taps and arrive at the detectors with approximately the same optical power. For example, node 3 is in electronic communication with the modulator 3 and can broadcast information to all eight nodes by controlling the modulator 3 to modulate at most p wavelengths of the unmodulated light transmitted along the bus waveguide 144 to produce at most p corresponding optical signals. The root optical tap 146 and optical taps 148 and 150 split the optical signals so that each of the detectors 1-8 receive the same optical signals with approximately the same optical power.

The broadcast system 140 is merely an example of a broadcast system that employs 50:50 optical taps to broadcast optical signals to eight nodes. The broadcast system 140 can be scaled up or down to handle broadcasts for a variety of nodal systems. This can be accomplished by adjusting the number of optical tap levels. The mathematical relationship between the number of 50:50 optical taps on any path of branching waveguides between the modulators and the detectors is given by:

$$\log_2 N = NSL$$

where NSL is the number of optical tap levels, and the base 2 of the logarithm corresponds to the 2 optical signals output from the optical taps. For example, for the eight node broadcast system 140, optical signals pass through 3 optical tap levels. For a 4 node system, the number of optical tap levels is 2, and for a 16 node system, the number of optical tap levels is 4.

Figure 1D:
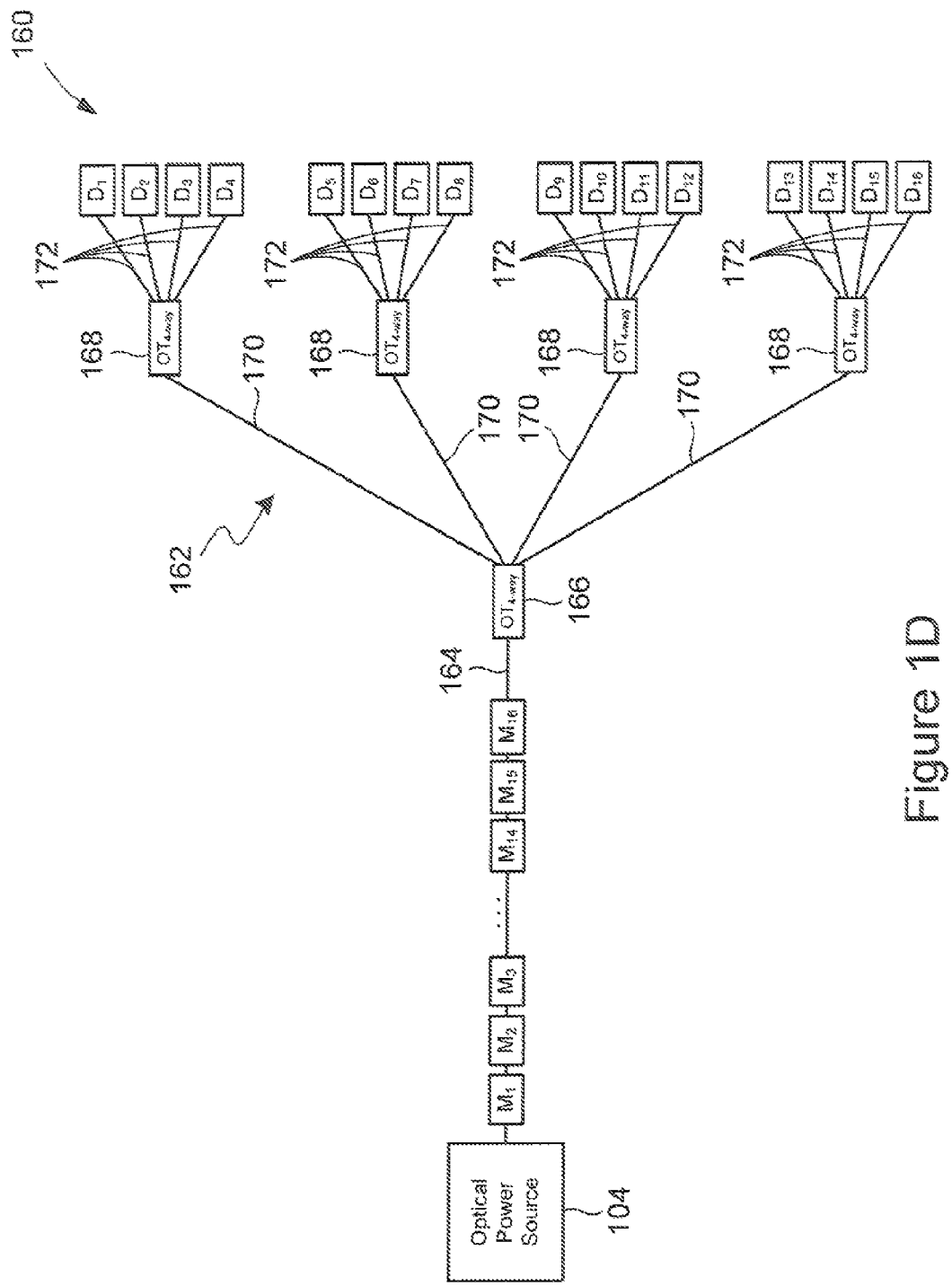
FIG. 1D-1E shows tree topologies of two optical broadcast tree systems configured in accordance with embodiments of the present invention.

FIG. 1D shows a tree topology of a second optical broadcast tree system 160 configured in accordance with embodiments of the present invention. The broadcast system 160 includes an optical broadcast tree bus 162 having a quaternary tree configuration. In particular, the broadcast tree bus 162 includes a bus waveguide modulator portion 164 that is optically coupled at one end to the source 104. The broadcast tree bus 162 includes two levels of optical taps. The first level includes a root optical tap 166 optically coupled to the bus waveguide 164, and a second level of optical taps 168. As shown in the example of FIG. 1C, each optical tap 168 is optically coupled to the root optical tap 166 via a single branching waveguide 170 and optically coupled to four detectors via separate branching waveguides 172.

The broadcast tree bus 162 is configured to support broadcast for a 16 node system. The detectors of the broadcast system 160 are also represented by the letter "D" and are each separately identified by subscripts 1-16. The broadcast system 160 also includes eight modulators represented by the letter "M" that are also separately identified by subscripts 1-16. The modulators are optically coupled to the bus waveguide modulator portion 164. Each modulator and corresponding detector having the same subscript is in electronic communication with the same node of the sixteen node system (not shown). For example, modulator 2 and detector 2 are electronically coupled to the same node (not shown).

The source 104 outputs p wavelengths of unmodulated light into the bus waveguide 164 using WDM or DWDM. Any one of the nodes can broadcast information to all of the nodes over the bus waveguide 162 by controlling an associated modulator to modulate at most p wavelengths of the unmodulated wavelengths of light propagating along the bus waveguide 164 to produce at most p optical signals that carry the information to the branching waveguides. The optical taps are 4-way splitters that split optical signals entering each optical tap into four identical optical signals each of which has approximately the same optical power. Thus, all of the optical signals pass through two optical taps and arrive at the detectors with approximately the same optical power. For example, the node in electronic communication with the modulator 2 can broadcast information to all 16 nodes by controlling the modulator 2 to modulate at most p wavelengths of the unmodulated light transmitted along the bus waveguide modulator portion 164 to produce at most p corresponding optical signals. The root optical tap 166 and optical taps 168 in the detector portion of the waveguide split the optical signals so that each of the detectors 1-16 receive the same optical signals with approximately the same optical power.

The broadcast system 160 is merely an example of a broadcast system that employs 4-way optical taps to broadcast optical signals to 16 nodes. The broadcast system 160 can be scaled up or down to handle broadcasts for a variety of different systems. This can be accomplished by correspondingly adjusting the number of optical tap levels. The mathematical relationship between the number of 4-way optical taps on any path of branching waveguides between the modulators and the detectors is given by:

$$\log_4 N = NSL$$

where the base 4 of the logarithm corresponds to the 4 optical signals output from the optical taps. For example, for the 16 node broadcast system 160, optical signals pass through 2 optical tap levels. For a 4 node system the number of optical tap levels is 1, and for a 32 node system the number of optical tap levels is 4.

In general, the mathematical relationship between the number of nodes N, the number q of output optical signals from each optical tap, and the number of optical tap levels NSL located along each path of branching waveguides between modulators and detectors is given by:

$$\log_q N = NSL$$

Figure 1E:
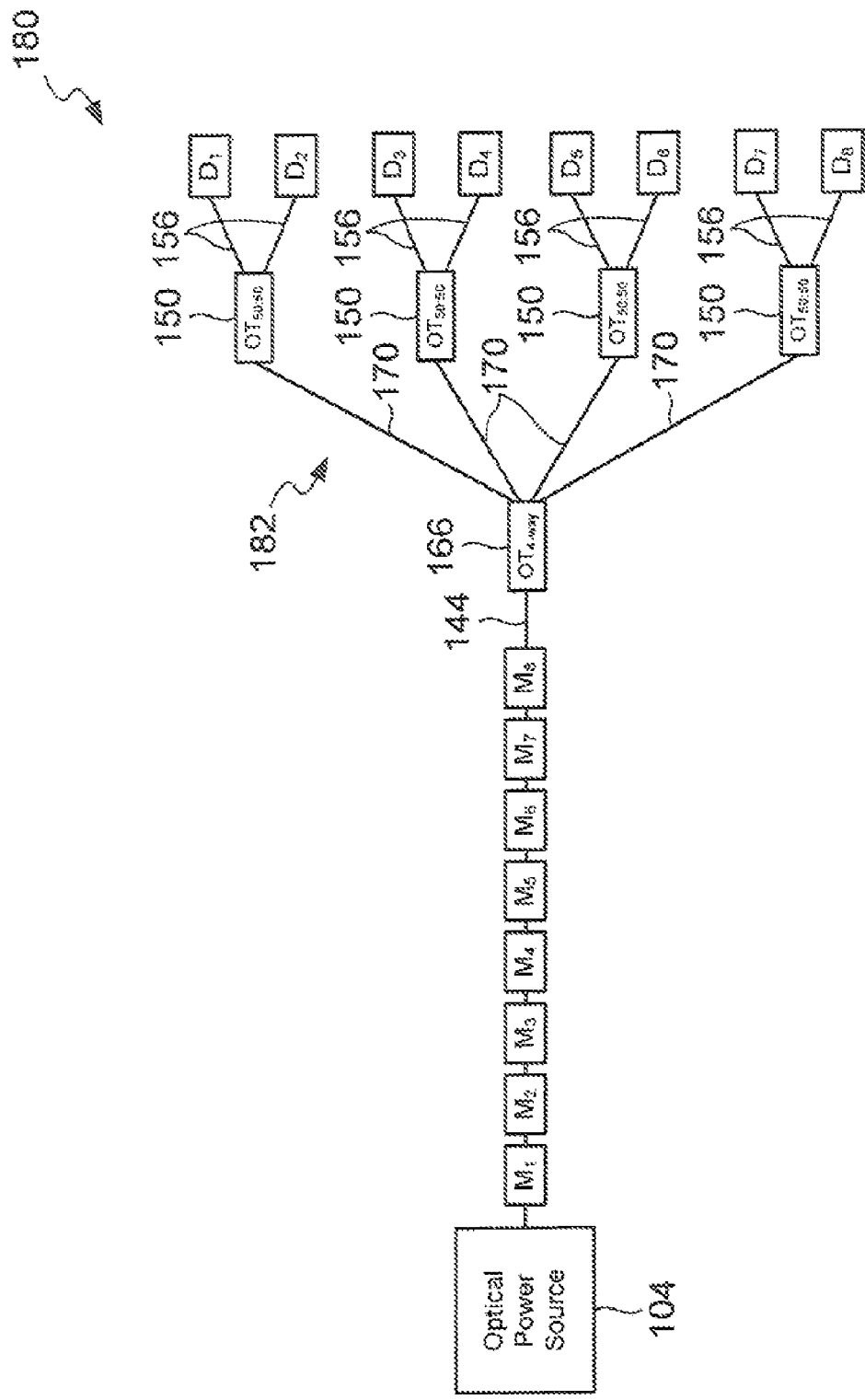

In other embodiments, different types of optical broadcast tree systems can be configured to deliver optical signals having approximately the same optical power to the detectors. In these embodiments, each optical tap level of the optical broadcast bus can be composed of different types of optical taps. For example, FIG. 1E shows a tree topology of a third optical broadcast tree system 180 configured in accordance with embodiments of the present invention. The optical broadcast tree bus 182 is nearly identical to the broadcast tree bus 142 except the 50:50 root optical tap 146, the first level of 50:50 optical taps 148, and connecting branching waveguides 152 and 154 have been replaced by the single root 4-way optical tap 166 with branching waveguide 170 of the broadcast tree bus 162. The optical broadcast tree bus detector portion 182 enables optical signals generated by the modulators 1-8 to reach all of the detectors 1-8 with approximately the same optical power.

Each of the tree topologies represented in the second and third optical broadcast tree systems 160 and 180 can be implemented in a wrap-around arrangement of a modulator portion followed by the detector waveguide portion so that a modulator of a node can broadcast modulated optical signals which can be received by detectors at all of the other nodes. These wrap-around arrangements also enable each node to modulate and detect optical signals on the same clock skew.

Note that optical broadcast bus configurations are not limited to the simple bus waveguide configurations shown in FIGS. 1A and 1C. Other configurations are possible depending on how the nodes are arranged. For example, the modulator and detectors portions can be configured to pass each of the 64 nodes in an 8×8 64 node system by configuring the modulator portion and the detector portion of the bus waveguide in a wrap-around arrangement that winds past each of the 64 nodes in a snake-like manner.

In a synchronous system with a separate clock, the system clock distribution follows the same topology as the broadcast so that the relative timing of clock and data is maintained. Alternately, a number of possible schemes exist for routing the clock with the data on the same waveguide: either by dedicating one wavelength on a waveguide to the clock, or by using an encoding of the clock with data such as 8b10b encoding.

II. Modulators

Figure 2:
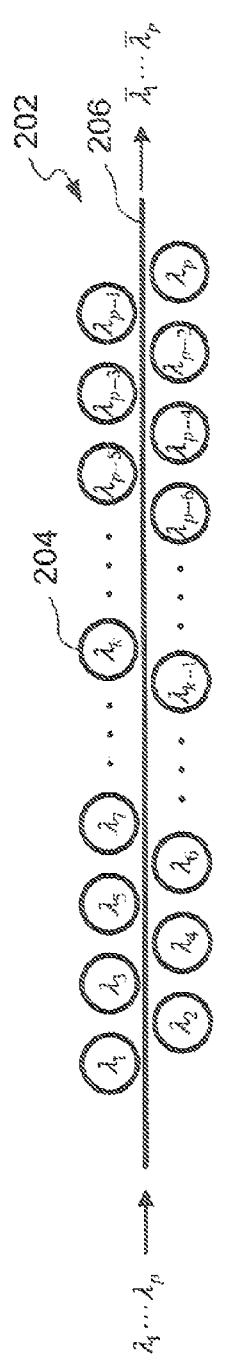
FIG. 2 shows a modulator configured in accordance with embodiments of the present invention.

FIG. 2 shows a modulator 202 configured in accordance with embodiments of the present invention. The modulator 202 comprises p resonators, such as resonator 204, disposed adjacent to a bus waveguide 206. A resonator is a type of wavelength selective element that can be configured to have resonance with light of a particular wavelength. Each resonator is in optical communication with the waveguide 206 and electronically coupled to a node (not shown). As shown in the example of FIG. 2, light composed of p separate, unmodulated wavelengths, denoted by $\lambda_1 \ldots \lambda_p$, is output from the optical power source 104 (not shown) and carried by the bus waveguide 206. The resonators are each electronically tunable, and each resonator is configured to have resonance with one of the wavelengths $\lambda_1 \ldots \lambda_p$ when an appropriate voltage is applied, in which case the resonator is said to be "active." As shown in FIG. 2, each of the resonators is labeled with one of the wavelengths $\lambda_1 \ldots \lambda_p$ in order to identify the wavelength that each resonator has resonance with when active. When a resonator is active, it extracts light of the associated wavelength from the bus waveguide 206 via evanescent coupling. The trapped light ultimately decays and leaks out via losses associated with the resonator. While the resonator is active, the intensity or amplitude of the light carried by the waveguide 206 drops at the active resonator. When the voltage is no longer applied, the resonance wavelength of the resonator shifts away from the wavelength of the light, the intensity or amplitude of the light carried by the waveguide 206 returns, and the light propagates undisturbed along the bus waveguide 206 past the resonator. When no voltage is applied to a resonator, the resonator is said to be "inactive."

The nodes generate optical signals by applying voltage signals to each of the resonators. Each voltage signal is composed of a pattern of "on" and "off" or "high" and "low" voltages that represent binary information output from an electronically coupled node. For example, an "on" voltage can represent the binary number "0" and an "off" voltage can represent the binary number "1." A pattern of "on" and "off" voltages applied to a single resonator causes the resonator to correspondingly switch between active and inactive states, which modulates the amplitude of light of the same wavelength. The modulated light is an optical signal composed of a "low" and "high" intensity pattern transmitted along the waveguide 206, where a "low" intensity can represent the binary number "0" and a "high" intensity can represent the binary number "1." In other words, the "low" and "high" intensity pattern of the optical signal corresponds to the "on" and "off" voltage pattern of the voltage signal.

Figure 3:
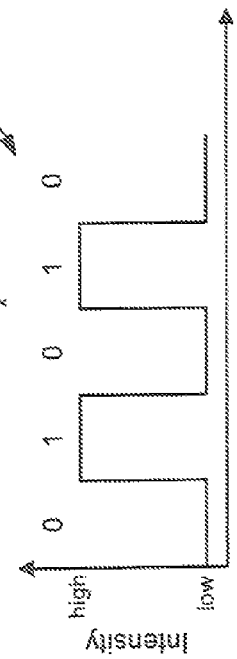
FIG. 3 shows three plots representing intensity modulation of unmodulated light in accordance with embodiments of the present invention.
Figure 3:
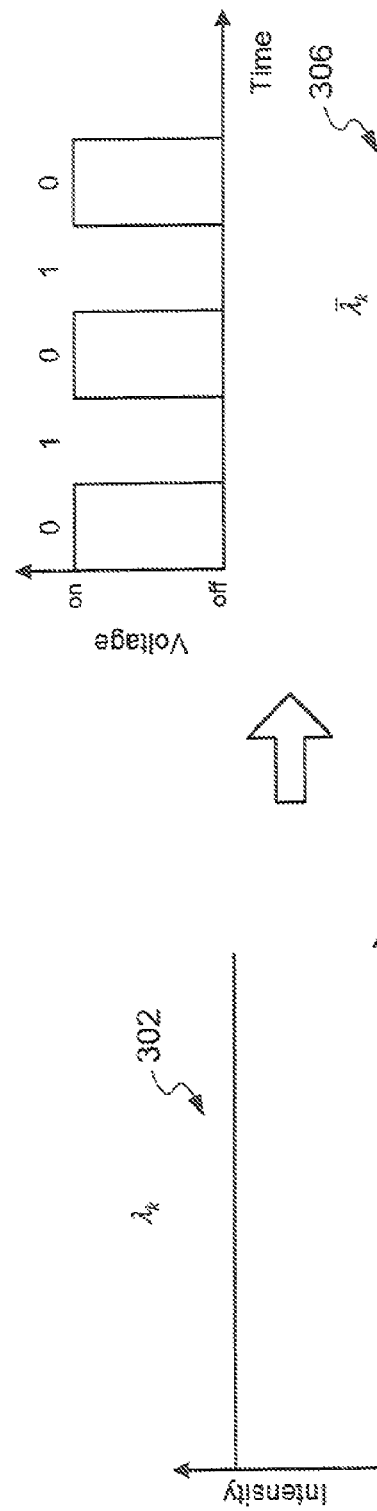

FIG. 3 shows three plots representing intensity modulation of unmodulated light of a particular wavelength $\lambda_k$ in accordance with a particular voltage pattern provided by a node (not shown). A first plot 302 represents the substantially continuous intensity of unmodulated light of the wavelength $\lambda_k$ carried by the waveguide 206 prior to passing the resonator 204. A second plot represents a pattern of "on" and "off"

voltages representing the binary number "01010" generated by the node (not shown) electronically coupled to the modulator 202. The voltage pattern of plot 304 is applied to the resonator 204. A third plot 304 represents a pattern of "low" and "high" intensities of an optical signal of the same wavelength denoted by $\overline{\lambda}_k$ carried by the waveguide 206 just after passing the resonator 204. Plots 304 and 306 reveal that when an "on" voltage is applied to the resonator 204 for a period of time long enough to represent the binary number "0," the intensity of the light of wavelength $\lambda_k$ near the resonator 204 is low for approximately the same period of time. When the voltage is turned "off" for a period of time long enough to represent the binary number "1," the intensity of the light of wavelength $\lambda_k$ near the resonator 204 is restored for approximately the same period of time. In other words, the "low" and "high" intensity pattern of the optical signal also represents the binary number "01010." When the "on" voltage is applied to the resonator 204, the resonator 204 extracts the light of wavelength $\lambda_k$ from the waveguide 206 causing the intensity of the light passing the resonator 204 to drop accordingly from "high" to "low." However, as soon as the voltage is turned "off," the resonance of the resonator 204 shifts away from that of the light, the light ceases being absorbed from the waveguide 206 into the resonator 204, and the intensity of the light passing the resonator 204 is restored to "high." As a result, the same data encoded in a pattern of "on" and "off" voltages is instantiated in the "low" and "high" intensities, respectively. The modulators can be operated at modulation rates in excess of approximately 10 Gbits/sec.

Returning to FIG. 2, the p resonators of the modulator 202 can be operated independently to separately modulate each of the p wavelengths of light $\lambda_1 \ldots \lambda_p$ to generate p corresponding optical signals denoted by $\overline{\lambda}_1 \ldots \overline{\lambda}_p$.

III. Detectors

Figure 4:
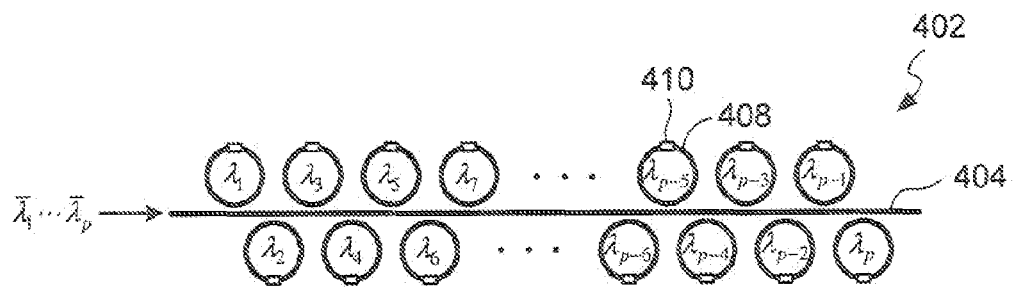
FIG. 4 shows a detector optically coupled to the bus waveguide via a branching waveguide and an optical tap in accordance with embodiments of the present invention.

FIG. 4 shows a detector 402 configured in accordance with embodiments of the present invention. The detector 402 is composed of p resonators that are electronically coupled to a node (not shown). Unlike the resonators of the modulator 204 described above, the resonators of the detector 402 are kept permanently in the active, resonant state. Instead, each resonator of the detector 402 is configured to have resonance with one of the p optical signals. As a result, each resonator of the detector 402 extracts via evanescent coupling a corresponding wavelength of light. Each resonator of the detector 402 is also configured with a detector portion. For example, a resonator 408 is configured with a detector portion 410. An optical signal $\overline{\lambda}_{p-5}$ is evanescently coupled into the resonator 408. The detector portion 410 converts the "low" and "high" intensity pattern of the optical signal $\overline{\lambda}_{p-5}$ trapped in the resonator 408 into a corresponding "on" and "off" electrical signal that is transmitted to the electronically coupled node (not shown). The p resonators of the detector 402 can operate independently to separately evanescently couple each of the p optical signals $\overline{\lambda}_1 \ldots \overline{\lambda}_p$ from the branching waveguide 404 to generate p separate and corresponding electrical signals that are transmitted to the electronically coupled node (not shown).

IV. Optical Taps

Returning to FIG. 1A, in general, the optical taps are configured so that each of the N detectors receives each of the p optical signals with approximately the same optical power. This can be accomplished by ideally configuring each optical tap to divert a fraction ($R_n$) of the optical signal power into an optically coupled branching waveguide in accordance with:

$$R_n = \frac{1}{(N-n+1)}$$

and transmit a fraction ($T_n$) of the optical signal power on the bus waveguide 102 in accordance with:

$$T_n = \frac{(N-n)}{(N-n+1)}$$

where ideally $R_n+T_n=1$, and n is an integer representing an optical tap index located along the bus waveguide 102 such that $1 \leq n \leq N-1$, 1 representing the optical tap 122 and N−1 representing the optical tap 126.

In practice, however, the bus waveguide 102 and the optical taps contribute to optical power loss that can cause the optical signals to attenuate as the optical signals propagate along the bus waveguide 102. The amount of optical power that needs to be injected into the bus waveguide 102 so that the optical signals can be broadcast to all of the N nodes can be determined by:

$$P = \sum_{n=1}^{N} \frac{D}{b^n} = \frac{D(b^{-N}-1)}{1-b}$$

where D represents the optical power reaching each detector, and b represents the fraction of optical power transmitted after allowing for waveguide and optical tap loss. The ratio of diverted to transmitted optical power at optical tap 1 is given by:

$$S_1 = \frac{D}{bP} = \frac{(1-b)}{b(b^{-N}-1)}$$

Subsequent optical tap ratios are given by:

$$S_{n+1} = \frac{S_n}{b(1-S_n)}$$

Figure 5A:
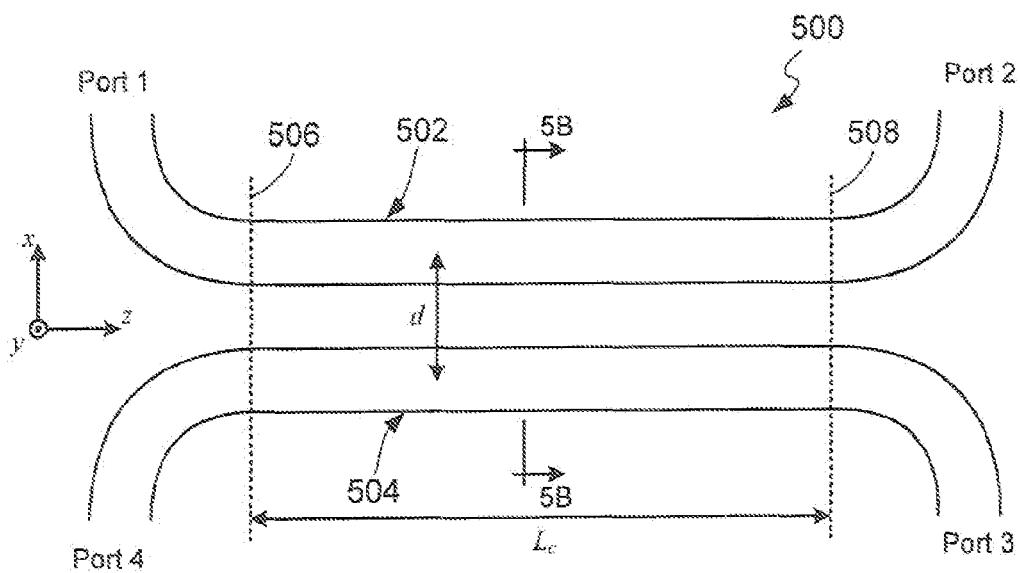
FIG. 5A shows a top view of an evanescent coupler configured in accordance with embodiments of the present invention.

Any number of different light diverting devices can be used for the optical taps. An evanescent coupler is a kind of optical tap that can be employed in the present invention. FIG. 5A shows a top view of an evanescent coupler 500 configured in accordance with embodiments of the present invention. For a general description of various kinds of evanescent couplers see "Analysis and design of highly broad-band, planar evanescent couplers," S. J. Hewlett et al., *Optical and Quantum Electronics*, vol. 28, pp 71-81 (1996). The coupler 500 is composed of two ridge waveguides 502 and 504, both of which have curved input/output arms of constant bend radius, which leads to a uniform central region of length $L_c$ between dashed-lines 506 and 508, and center-to-center waveguide separation d. The ridge waveguide 502 can be a portion of a branching waveguide that carries optical signals to a detector, and the ridge waveguide 504 can be a portion of the broadcasting waveguide 102 that carries the optical signals. The waveguides 502 and 504 can have an air cladding, or the waveguides 502 and 504 can be embedded in a material having a relatively smaller refractive index than the material comprising the waveguides. The coupler 500 can be designed to take into account the contribution to coupling from the curved input and output arms and from the central region where evanescent coupling is strongest.

Figure 5B:
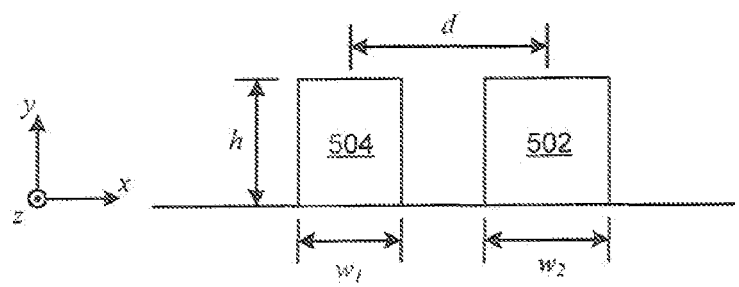
FIG. 5B shows a cross-sectional view of the coupler along a line 5B-5B, shown in FIG. 5A, in accordance with embodiments of the present invention.

FIG. 5B shows a cross-sectional view of the central region of the coupler 500 along a line 5B-5B, shown in FIG. 5A, in accordance with embodiments of the present invention. The waveguides have different rectangular cross-sectional geometries. As shown in the example of FIG. 5B, the waveguides have substantially the same height but different widths, which corresponds to different waveguide aspect ratios of $w_1/h$ and $w_2/h$.

When an optical signal of unit optical power is injected into Port 4 of the waveguide 504 and zero optical power into Port 1 of the waveguide 502 at the points identified by dashed line 506, the fractional powers of the optical signal exiting ports 2 and 3 at the dashed-line 508 are described by the expressions:

$$FP_2 = F^2 \sin^2 \phi, \text{ and}$$

$$FP_3 = 1 - F^2 \sin^2 \phi$$

where $\phi = C_0 L_c/F$, $F^2$ represents the maximum fractional optical power transfer between waveguides, and $C_0$ represents the coupling coefficient that exponentially decreases with increasing waveguide separation.

Returning to FIGS. 1B-1D, the optical taps located at the branch points of the optical broadcast trees can be appropriately configured to operate as 50:50 splitters employed in the optical broadcast tree system 140 of FIG. 1B can be optical taps ideally configured with $R=T=\frac{1}{2}$ or Y-shaped waveguides. The 4-way optical taps of the optical broadcast tree system 160 can be configured using three successive optical taps ideally configured with $R=T=\frac{1}{2}$ or three successive Y-shaped waveguides.

V. On-Chip Implementations

The optical broadcast systems described above can be implemented in an optical layer on a single chip. For example, in certain embodiments, the chip size can be approximately 25×25 mm and have 64 or more nodes. The waveguides can have cross-sectional dimensions of approximately 200×500 nm, the modulators and detectors can have lengths ranging from approximately 40-60 µm, the microrings can be separated by 0.5-5 µm, the diameter of the microrings can range from approximately 1-20 µm, and the length $L_c$ of the optical taps can range approximately 0.02-1 mm. Note that these dimension ranges represent exemplary ranges and are by no means intended to limit the broad range of dimensions over which optical broadcast systems of the present invention can be employed. Thus, these dimensions and dimension ranges can vary depending on the particular implementation.

VI. Arbitration

Two nodes may broadcast simultaneously, but the broadcasting nodes may not modulate over each node's broadcast transmission. For example, when unmodulated light passes two nodes on the bus waveguide 102, these nodes may simultaneously broadcast by modulating different wavelengths of the light. For example, returning to FIG. 1A, assume nodes 1 and j are permitted to broadcast simultaneously on the bus waveguide 102. Node 1 modulates particular wavelengths of the unmodulated light output from the optical power source 104 to produce optical signals that are transmitted on the modulator portion 106 of the bus waveguide 102. If node j modulates the same wavelengths of the optical signals generated by node 1, the modulation process destroys the information carried by the optical signals generated by node 1. In addition, because node j is modulating already modulated optical signals, any information node j tries to embed in the optical signals generated by node 1 is also incomprehensible. Thus, as long as node 1 and node j modulate different wavelengths of the light generated by the source 104, both nodes may broadcast simultaneously.

In order to prevent two or more nodes from corrupting a broadcast, each node is granted exclusive use of the optical broadcast bus or certain wavelengths for a period time to broadcast information to all nodes. Arbitration can be performed using a well-known electronic-based arbitration system and method, or the arbitration can be performed using an all optical system and method as follows.

Figure 6:
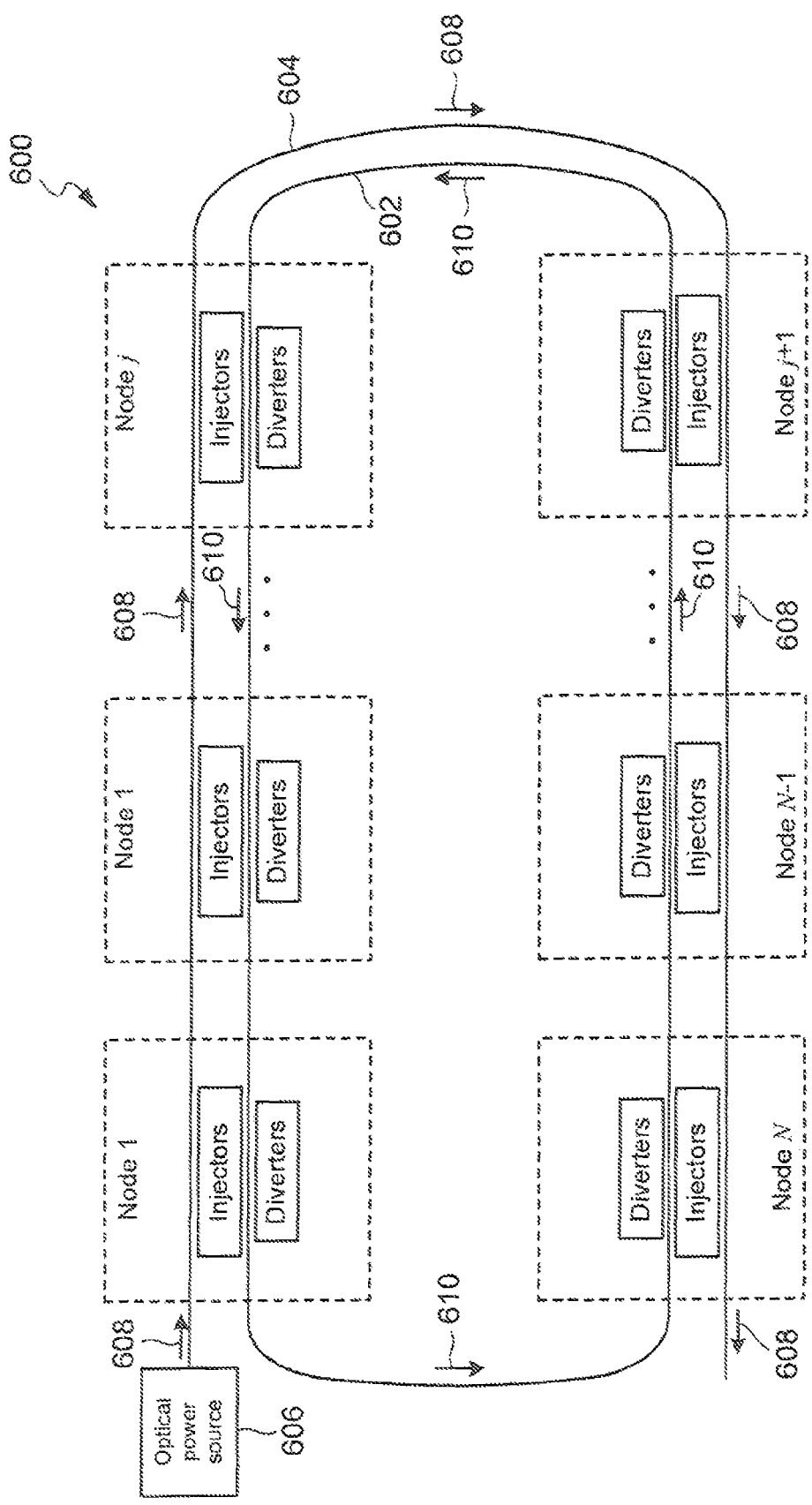
FIG. 6 shows a schematic representation of an arbitration system configured in accordance with embodiments of the present invention.

FIG. 6 shows a schematic representation of an arbitration system 600 configured in accordance with embodiments of the present invention. The arbitration system 600 includes a token-ring waveguide 602 and a power waveguide 604 coupled to an optical power source 606. The arbitration system 600 includes N injectors that are each electronically coupled to one of the N nodes and optically coupled to both the token-ring waveguide 602 and the power waveguide 604. The arbitration system 600 also includes N diverters that are electronically coupled to each of the N nodes which control them respectively and optically coupled to the token-ring waveguide 602. In this example, the diverters are disposed in the inner region of, and adjacent to, the token-ring waveguide 602. In certain embodiments, the waveguides 602 and 604 can be ridge waveguides, described below in the subsections Microrings and Ridge Waveguides.

The source 606 can be the same source 104 or a different optical power source that employs WDM or DWDM to inject unmodulated light composed of different wavelengths into the power waveguide 604. The light travels in the direction identified by directional arrows 608. Each wavelength of light can be associated with a different resource. A resource can be located at a particular node, such as an output port, or a resource can be a common or shared resource that can be used by more than one node, such as an optical broadcast bus or wavelengths of light output from the optical power source 104. For example, the wavelength denoted by $\lambda_{BW}$ output from the source 606 can be assigned to represent an optical broadcast bus.

Each of the N injectors is also composed of a set of electronically tunable resonators. Each resonator can be configured to have resonance with one of the wavelengths of light injected by the source 606. When a resonator is activated by an electronically coupled node, it extracts via evanescent coupling the light from the adjacent power waveguide 604, trapping the extracted light within the resonator for a period of time before the light is transmitted via evanescent coupling into the token-ring waveguide 602. The light then propagates in the token-ring waveguide 602 in the direction identified by directional arrows 610. When the voltage is no longer applied, the resonance wavelength of the resonator shifts away from the wavelength of the light, and the light propagates undisturbed along the power waveguide 604 past the resonator, while the light injected into the token-ring waveguide 602 continues circulate in a counterclockwise manner.

Each of the N diverters is composed of a set of electronically tunable resonators. Each of the resonators in a diverter is configured to extract light of a particular wavelength from the token-ring waveguide 602. The resonators can be configured with a detector as described above with reference to FIG. 4 so that when a resonator extracts light of a particular wavelength, the detector portion generates an electrical signal that is transmitted electronically to an electronically coupled node to indicate that the light has been extracted from the token-ring waveguide 602.

Light of a particular wavelength injected into the token-ring waveguide 602 is called a "token." The token can be in the form a pulse of light of a particular wavelength that conveys the right to use a particular associated resource. For example, the token associated with an optical broadcast bus can be represented by the presence of a pulse of light of the wavelength $\lambda_{BW}$ on the token-ring waveguide 602.

Arbitration of a resource can be performed using the arbitration system 600 as follows. In general, before arbitration begins, each resource is assigned a particular wavelength of light injected by the source 606 into the power waveguide 604. The token with wavelength $\lambda_{BW}$ is used by the N nodes to determine the availability of a particular resource. When the token $\lambda_{BW}$ is circulating on the token-ring waveguide 602, the resource is available for use. A node can only use the resource when the node extracts the token $\lambda_{BW}$ from the token-ring waveguide 602 via a resonator of the diverter electronically coupled to the node. The token $\lambda_{BW}$ is trapped within the resonator and the detector portion transmits electrical signals to the electronically coupled node confirming the presence of the token $\lambda_{BW}$. The node can then begin using the resource. Other nodes in need of using the resource have to wait until the token $\lambda_{BW}$ is available on the token-ring waveguide 602. When the node has finished using the resource, the node refreshes the token $\lambda_{BW}$ on the token-ring waveguide 602 by employing a resonator of the electronically coupled injectors to inject a token with the wavelength $\lambda_{BW}$ into the token-ring waveguide 602.

VII. Method for Broadcasting

Figure 7:
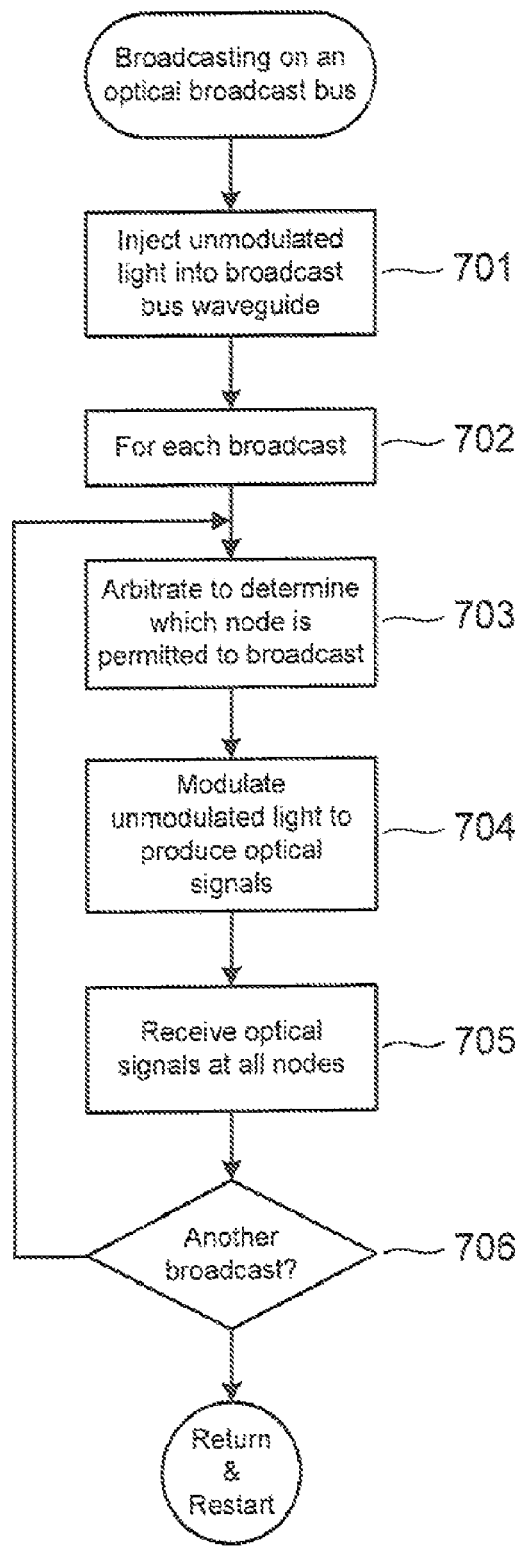
FIG. 7 shows a control-flow diagram illustrating a method of broadcasting over an optical broadcast system in accordance with embodiments of the present invention.

FIG. 7 shows a control-flow diagram illustrating a method for broadcasting over an optical broadcast system in accordance with embodiments of the present invention. In step 701, unmodulated light composed of p different wavelengths is injected into a bus waveguide, as described above with reference to FIG. 1. In the for-loop of step 702, steps 703-706 are repeated for each broadcast. In step 703, an arbitration method and system, such as the method and system described above with reference to FIG. 6, is used to determine which a node is permitted to broadcast on the bus waveguide. In step 703, a node with permission to broadcast modulates the unmodulated light to produce optical signals that are placed on the bus waveguide, as described above with reference to FIGS. 2-3. In step 705, all of the nodes extract a portion of the optical signals from the bus waveguide, as described above with reference to FIGS. 4-5. In step 706, the method returns and restarts for the next broadcast on the bus waveguide.

VIII. Microring Resonators and Ridge Waveguides

Figure 8A:
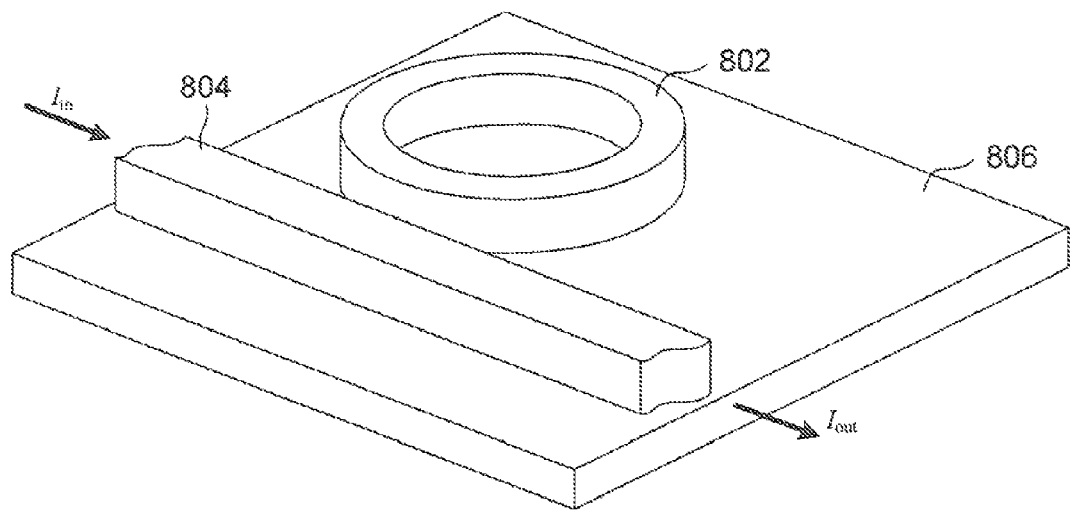
FIG. 8A shows an isometric view of a microring resonator and a portion of an adjacent ridge waveguide configured in accordance with embodiments of the present invention.

In certain system embodiments, the waveguides can be ridge waveguides, and the resonators can be microring resonators. FIG. 8A shows an isometric view of a microring resonator 802 and a portion of an adjacent ridge waveguide 804 disposed on the surface of a substrate 806 and configured in accordance with embodiments of the present invention. Optical signals transmitted along the waveguide 804 are evanescently coupled from the waveguide 804 into the microring 802 when the optical signals satisfy the resonance condition:

$$n_{eff}C = \lambda m$$

where $n_{eff}$ is the effective refractive index of the microring 802, C is the circumference of the microring 802, m is an integer, and $\lambda$ is the wavelength of an optical signal. The product $n_{eff}C$ is the optical length of the cavity. In other words, optical signals with wavelengths that are integer multiples of the wavelength $\lambda$ are evanescently coupled from the waveguide 804 into the microring 802.

Evanescent coupling is the process by which evanescent waves of light are transmitted from one medium, such as microring, to another medium, such a ridge waveguide, and vice versa. For example, evanescent coupling between the microring resonator 802 and the ridge waveguide 804 occurs when the evanescent field generated by light propagating in the waveguide 804 couples into the microring 802. Assuming the microring 802 is configured to support the modes of the evanescent field, the evanescent field gives rise to light that propagates in the microring 802, thereby evanescently coupling the light from the waveguide 804 into the microring 802.

Figure 8B:
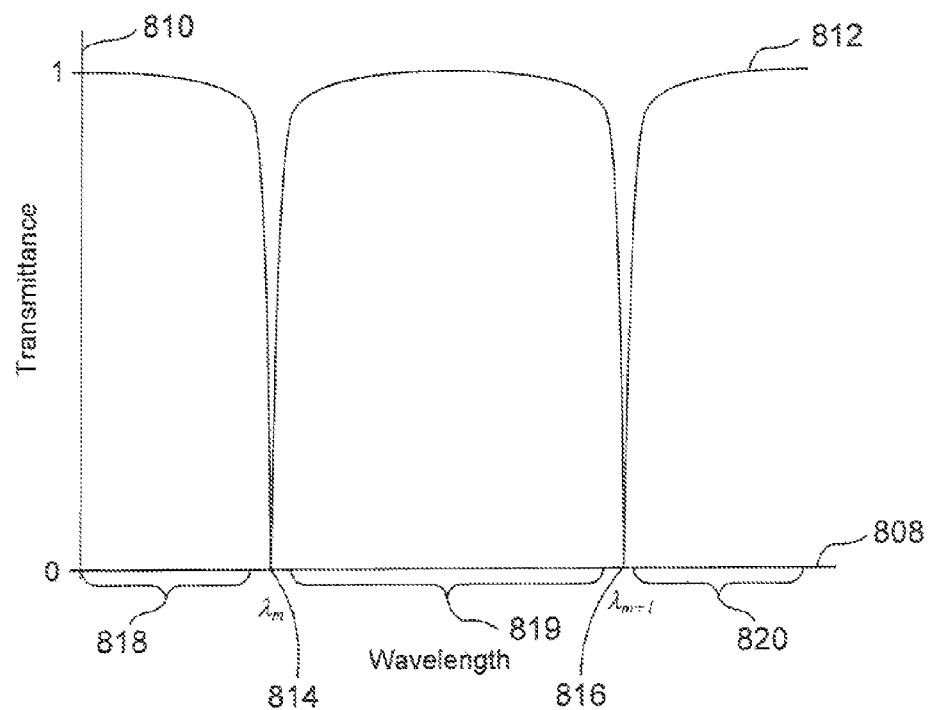
FIG. 8B shows a plot of transmittance versus wavelength for a microring in accordance with embodiments of the present invention.

FIG. 8B shows a plot of transmittance versus wavelength for the microring 902 and the waveguide 804 shown in FIG. 8A. Horizontal line 808 represents a wavelength axis, vertical line 810 represents a transmittance axis, and curve 812 represents the transmittance of optical signals passing the microring 802 over a range of wavelengths. The transmittance of an optical signal passing the microring 802 is defined by:

$$T = \frac{I_{out}}{I_{in}}$$

where $I_{in}$ is the intensity of the optical signal propagating along the waveguide 804 prior to reaching the microring 802, and $I_{out}$ is the intensity of the optical signal propagating along the waveguide 804 after passing the microring 802. Minima 814 and 816 of the transmittance curve 812 correspond to zero transmittance for optical signals having wavelengths $\lambda_m = L/m$ and $\lambda_{m+1} = L/(m+1)$, where L is the optical length of the cavity. These wavelengths represent only two of many regularly spaced minima. These optical signals satisfy the resonance condition above, are said to have a "strong resonance" with the microring 802, and are evanescently coupled from the waveguide 804 into the microring 802. In the narrow wavelength regions surrounding the wavelengths $\lambda_m$ and $\lambda_{m+1}$, the transmittance curve 812 reveals a steep increase in the transmittance the farther the wavelength of an optical signal is away from the wavelengths $\lambda_m$ and $\lambda_{m+1}$. In other words, the strength of the resonance decreases, and the portion of the optical signal coupled from the waveguide 804 into the microring 802 decreases the farther an optical signal's wavelength is away from a resonant wavelength. Optical signals with wavelengths in the regions 818-820 pass the microring 802 substantially undisturbed.

Figure 9A:
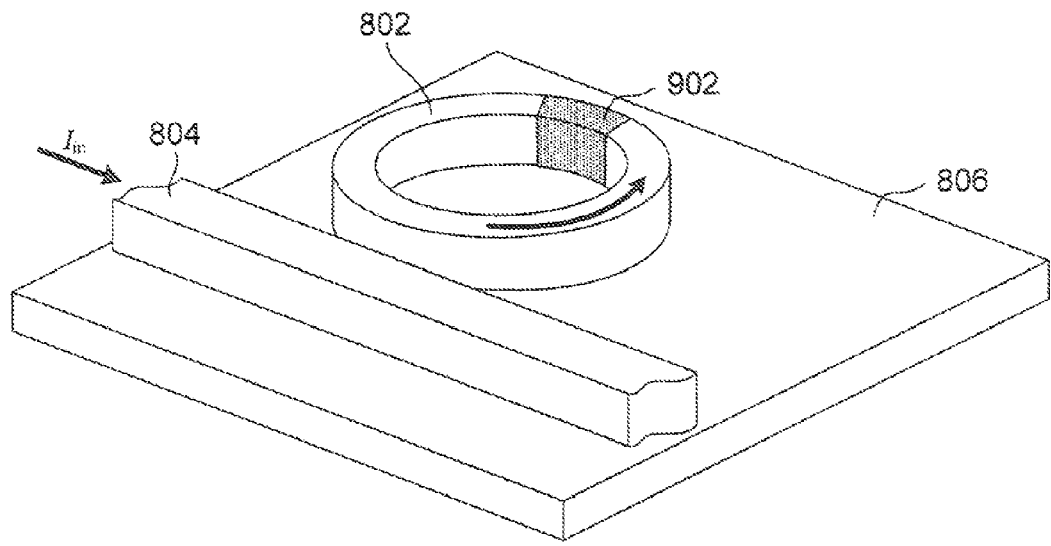
FIG. 9A shows the microring resonator used as a photodetector in accordance with embodiments of the present invention.
Figure 9B:
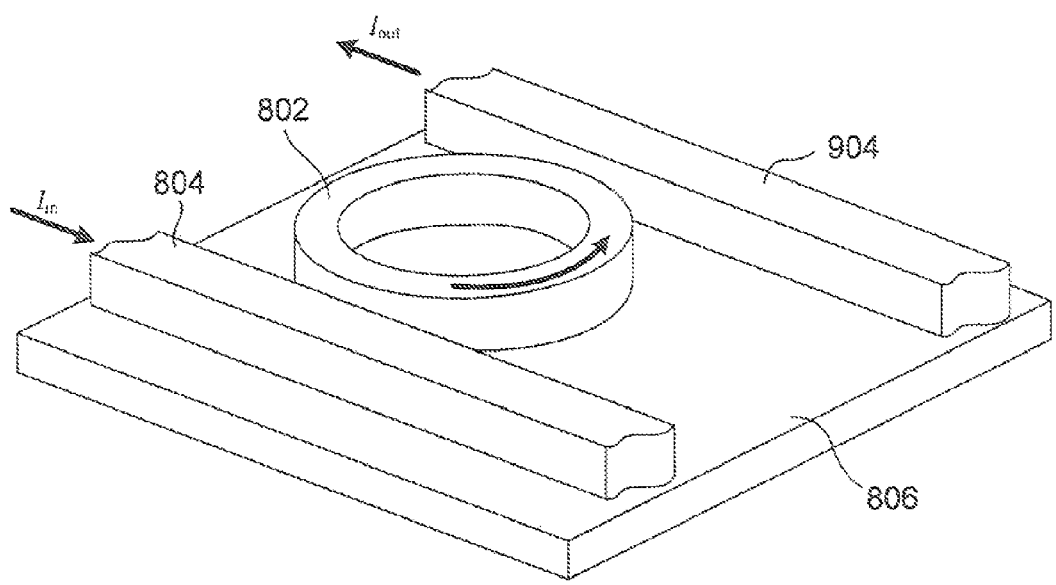
FIG. 9B shows the microring resonator used to couple an optical signal from a first waveguide into a second waveguide in accordance with embodiments of the present invention.

Because of the evanescent coupling properties of microring resonators, microring resonators can be used to detect particular optical signals transmitting along an adjacent waveguide, or microring resonators can be used to couple optical signals of a particular wavelength from one adjacent waveguide into another adjacent waveguide. FIG. 9A shows the microring resonator 802 coupled to a detector portion 902 in accordance with embodiments of the present invention. An optical signal having a wavelength that is resonant with the microring 802 is evanescently coupled from the waveguide 804 into the microring 802 and remains trapped for a period of time while circulating within the waveguide 802. The detector portion 902 can be a SiGe doped region of the microring 802. The detector portion 902 absorbs the optical signal circulating in the microring 802 and converts the optical signal into an electronic signal that can be transmitted over signal lines to an electronically coupled node. FIG. 9B shows the microring resonator 802 used to couple an optical signal from the waveguide 804 into a second waveguide 904 in accordance with embodiments of the present invention. An optical signal having a wavelength that is resonant with the microring 802 is evanescently coupled from the waveguide 804 into the microring 802. The optical signal circulates with the microring 802 and is evanescently coupled into the waveguide 904. Note that the optical signal is transmitted along the waveguide 804 in one direction and the optical signal coupled into the second waveguide 904 is transmitted in the opposite direction.

Figure 10:
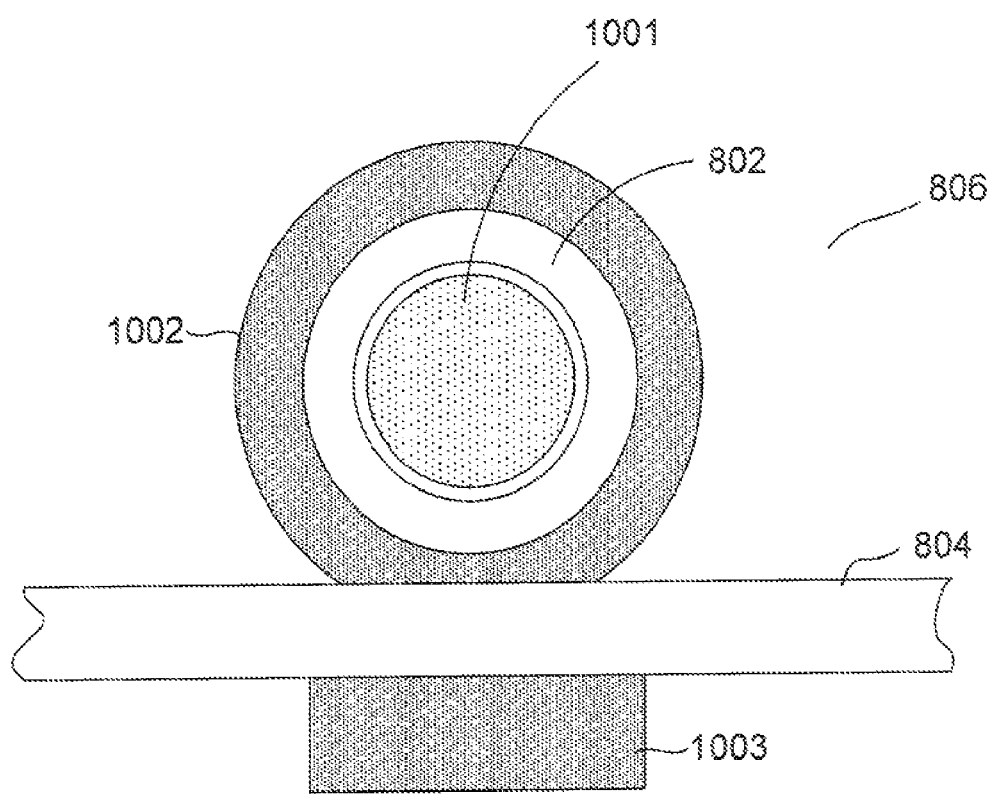
FIG. 10 shows a schematic representation and top view of doped regions surrounding a microring and ridge waveguide in accordance with embodiments of the present invention.

The microring 802 can be electronically tuned by doping regions of the substrate 806 surrounding the microring 802 and waveguide 804 with appropriate electron donor and electron acceptor atoms or impurities. FIG. 10 shows a schematic representation and top view of doped regions surrounding the microring 802 and the ridge waveguide 804 in accordance with embodiments of the present invention. In certain embodiments, the microring 802 comprises an intrinsic semiconductor. A p-type semiconductor region 1001 can be formed in the semiconductor substrate interior of the microring 902, and n-type semiconductor regions 1002 and 1003 can be formed in the semiconductor substrate 806 surrounding the outside of the microring 802 and on the opposite side of the waveguide 804. The p-type region 1001 and the n-type regions 1002 and 1003 form a p-i-n junction around the microring 802. In other embodiments, the dopants can be reversed in order to form an n-type semiconductor region 1001 in substrate interior of the microring 802 and p-type semiconductor regions 1002 and 1003 in the substrate surrounding the outside of the microring 802.

The electronically tunable microring 802 can be configured to evanescently couple or divert light from an adjacent waveguide when an appropriate voltage is applied to the region surrounding the microring. For example, the electronic controlled microring 802 can be configured with a circumference C and an effective refractive index $n_{eff}'$ such that an optical signal with a wavelength $\lambda$ propagating along the waveguide 804 does not satisfy the resonance condition as follows:

$$n'_{eff}C \neq m\lambda$$

where $n'_{eff}C$ is the optical length of the resonator. This optical signal passes the microring 802 undisturbed and the microring 802 is said to be turned "off." On the other hand, the microring 802 can be formed with suitable materials so that when an appropriate voltage is applied to the microring 802, the effective refractive index $n_{eff}'$ shifts to the refractive value $n_{eff}$ and the optical signal satisfies the resonance condition:

$$n_{eff}C = m\lambda$$

The optical signal is now coupled from the waveguide 804 into the microring 802 and the microring 802 is said to be turned "on." When the voltage is subsequently turned "off," the effective refractive index of the microring 802 shifts back to $n_{eff}'$ and the same optical signal propagates along the waveguide 804 undisturbed.

Note that system embodiments of the present invention are not limited to microring resonators and ridge waveguides. In other embodiments, any suitable resonator that can be configured to couple with a particular wavelength of light propagating along a waveguide can be used.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical broadcast system for broadcasting information from any node to all nodes of a system, the optical broadcast system comprising:
    an optical broadcast bus having a modulator portion and a detector portion, the optical broadcast bus configured so that the modulator portion passes each node and the detector portion passes each node;
    modulators optically coupled to the modulator portion and controlled by the nodes to generate optical signals carrying information from the modulator portion into the detector portion; and
    detectors optically coupled to the detector portion and controlled by the nodes so that all of the nodes receive the optical signals,
    wherein each modulator is configured to modulate unmodulated light by modulating different wavelengths of the unmodulated light by evanescently coupling each wavelength of the unmodulated light into a first resonator that is electronically controlled by an associated node.

2. The system of claim 1 further comprises an optical power source that injects the unmodulated light into the optical broadcast bus, wherein the unmodulated light is modulated by the nodes in the modulator portion to generate the optical signals.

3. The system of claim 1 wherein the detector portion further comprises:
    branching waveguides, each branching waveguide being optically coupled to at least one of the detectors; and
    optical taps configured to couple a portion of the optical signals from the optical broadcast bus, the optical broadcast bus comprising a wrap-around bus waveguide, into one of the branching waveguides.

4. The system of claim 3 wherein the optical taps are configured to distribute the optical signals so that each detector receives the optical signals with approximately the same optical power.

5. The system of claim 1 wherein the modulator portion and the detector portion further comprise portions of a broadcast tree bus configured to distribute the optical signals to the detectors with approximately the same optical power.

6. The system of claim 5 the broadcast tree bus further comprises:
    a wrap-around bus waveguide optically coupled to the modulators;
    optical taps configured to split optical signals into a number of optical signals having approximately the same optical power; and
    wrap-around branching waveguides configured to carry the optical signals between optical tap and into the detectors.

7. The system of claim 1 wherein the first resonators are disposed adjacent to the modulator portion, each first resonator being configured to evanescently couple with one wavelength of light carried by the modulator portion when an electronic signal is applied by a node, and wherein the detectors further comprise second resonators optically coupled to the detector portion, wherein each second resonator evanescently couples an optical signal of a particular wavelength from the detector portion and generate a corresponding electronic signal transmitted to a node.

8. The system of claim 7 wherein the first resonators further comprise microrings, each microring configured to evanescently couple light of a particular wavelength from an adjacent waveguide.

9. The system of claim 1 wherein the optical broadcast bus is implemented on a single integrated circuit chip.

10. A method for broadcasting information from any node to all nodes of a system comprising:
injecting unmodulated light into an optical broadcast bus having a modulator portion and a detector portion, the optical broadcast bus having a wrap-around configuration wherein the modulator portion passes each node and the detector portion passes each node;
arbitrating to determine which node can broadcast over the optical broadcast bus;
modulating the unmodulated light in the modulator portion of the optical broadcast bus to produce optical signals that travel from the modulation portion into the detector portion; and
receiving the optical signals at all of the nodes in the detector portion of the optical broadcast bus,
wherein modulating the unmodulated light further comprises modulating different wavelengths of the unmodulated light by evanescently coupling each wavelength of the unmodulated light into a resonator that is electronically controlled by an associated node.

11. The method of claim 10 wherein injecting the unmodulated light into the optical broadcast bus further comprises using wavelength division multiplexing or dense wavelength division multiplexing to inject multiple wavelengths of light into the optical broadcast bus.

12. The method of claim 10 wherein receiving the optical signals at each node further comprises distributing the optical signals so that each node receives the optical signals with substantially the same optical power.

13. The method of claim 12 wherein distributing the optical signals further comprises evanescently coupling a portion of each optical signal into each detector so that each detector receives the same optical signals with substantially the same optical power.

14. The method of claim 12 wherein distributing the optical signals further comprises splitting the optical signals into a number of substantially identical optical signals each have approximately the same optical power that are carried to the detectors.

* * * * *

UNITED STATES PATENT AND TRADEMARK OFFICE
CERTIFICATE OF CORRECTION

PATENT NO. : 8,391,714 B2
APPLICATION NO. : 12/999620
DATED : March 5, 2013
INVENTOR(S) : Nathan L. Binkert et al.

Page 1 of 1

It is certified that error appears in the above-identified patent and that said Letters Patent is hereby corrected as shown below:

In the Claims:

In column 16, line 58, in Claim 6, delete "the" and insert -- wherein the --, therefor.

Signed and Sealed this
First Day of October, 2013

Teresa Stanek Rea
*Deputy Director of the United States Patent and Trademark Office*